PROCESS FOR THE PRODUCTION OF LARGE SEMICONDUCTOR CRYSTALS

Filed June 24, 1958

INVENTORS
JEAN-MARIE GILLES
JEAN LEON VAN CAKENBERGHE
BY Ramon A. Klitzke
ATTORNEY 3,065,112

PROCESS FOR THE PRODUCTION OF LARGE SEMICONDUCTOR CRYSTALS

Jean-Marie Ferdinand Gilles, Brussels, and Jean Leon Van Cakenberghe, Beersel, Belgium, assignors to Union Carbide Corporation, a corporation of New York Filed June 24, 1958, Ser. No. 744,264
5 Claims. (Cl. 117—200)

The invention resides in a process for the production of large substantially planar crystals, especially single crystals, in the form of very thin bodies, particularly from semiconducting and luminescent materials.

It is well known in the manufacture of semiconductor devices that the crystalline structure of the material plays a very important role. For instance all practical applications of germanium or silicon, e.g. in transistors, rectifiers or photovoltaic cells involve the use of single crystals. One reason for this is that the mobility and life time of the current carriers are higher in a monocrystal than in a cluster of microcrystals. Another reason which has some connection with the preceding is that the amount of adsorption of undesirable impurities depends upon the surface to volume ration and increases with the number of particles in a given volume of material.

Therefore, a semiconductor device is in general prepared with a thin slab of material which is cut out of a larger single crystal. For technical reasons it is necessary to cut these slabs very thin (e.g. in order to reduce the resistance of rectifiers or to extend the frequency response of transistors). This cutting operation has a very low yield, because the larger part of the very expensive semiconductor material is lost as sawdust. Furthermore in some circumstances it is very difficult to cut the slabs as thin as desirable.

One can also prepare layers of crystalline material by direct synthesis and vacuum sublimation at high temperature. This procedure leads to either thick crystals of undefined shape and orientation which must afterwards be cut into thin slabs if some utility in the semiconductor field is to be expected or microcrystalline aggregates in which no single crystal of any appreciable size can be isolated. It is thus apparent that the direct production of large but thin single crystals of semiconductor materials should be an important progress, especially when the various applications of semiconductors are concerned.

Figure 1:
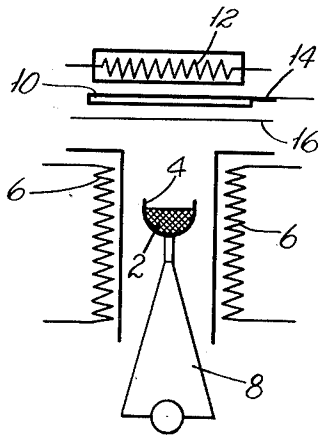
Figure 2:
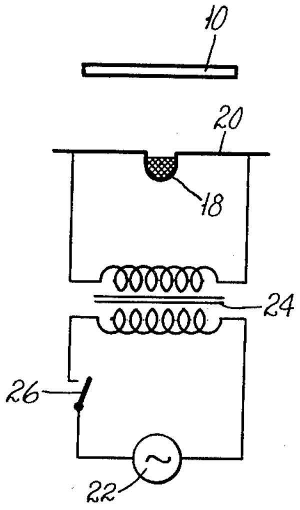
Figure 3:
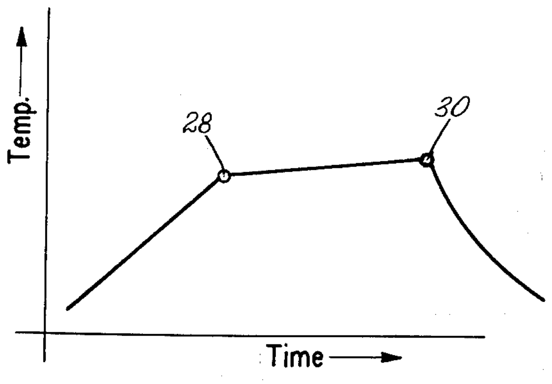

The object of the present invention is to provide a process for the direct production of single crystals of semiconductor material in form of substantially flat thin bodies. A further object is to provide a process for the production of strain free large but thin crystals of semiconductor material. A still further object of the invention is the production of large crystals of semi-conductor material in form of thin bodies which are ready for use in the various applications of semiconductors. A still further object is to provide large crystals of semiconductor material in form of thin bodies having exceptionally good electrical and photoconductive properties. Other objects of the invention will appear from the description and the figures which follow, in which FIGURES 1 and 2 represent an apparatus used for the invention and FIGURE 3 represents an experimental curve.

These objects have been achieved in accordance with this invention by a process for the preparation of crystals of semiconductor material which comprises the steps of depositing by vacuum evaporation a layer less than 0.1 mm. thick of said semiconductor material onto a substrate, activating the said layer with a sufficient amount of an activator material to promote the crystal growth of said layer and transforming it by heating in an inert atmosphere into crystals the main diameter of which is substantially larger than the said thickness, said crystals growing in a direction substantially parallel to the surface of said substrate.

These objects have further been met by the production of new and useful crystals of semiconductor material, said crystals having a main diameter substantially larger than their thickness and resulting from the transformation by heating in an inert atmosphere of a layer less than 0.1 mm. thick of said semiconductor material, said layer being preliminarily deposited onto a substrate by vacuum evaporation and activated with a sufficient amount of an activator material to promote the crystal growth.

The present invention is based upon the discovery that single crystals of semiconductor material are produced in form of large but thin bodies, e.g. less than 0.1 mm. thick, by a unique combination of steps which comprises the vacuum evaporation of the semiconductor crystal material as a thin layer onto a substrate, the addition of an activator material to promote the crystal growth and thereafter the transformation of that layer by heating in an inert atmosphere into the desired crystals. The crystals so prepared are in general ready for use in the various applications of semiconductor materials.

By an activator material one means a desirable impurity which, added to the semiconductor material, promotes crystal growth under the final heating step of the process. Thus activator materials found useful for the inventive process include silver, copper, aluminium, indium, gallium, lead, bismuth, zinc, boron, thallium, phosphorus, arsenic and antimony. The preferred activator substances are those substances which contribute also to produce desirable properties in the semiconductor material. For instance, in the case of germanium one can use, as activator material, substances like aluminium, gallium, indium or boron which are known to produce p type composition or alternatively phosphorus, arsenic or antimony to affect n type composition. Similarly the above activator material can be used with silicon to affect the p or n type compositions respectively. Thus the inventive process includes the use, as activator material, of substances which contribute to produce desirable properties in the semiconductor material, e.g. substances which affect the p or n type compositions. It is apparent that one can also use a neutral material as activator such as, for instance, silicon in germanium. For cadmium sulphide or zinc sulphide, the activator material should preferably be copper or silver which are most effective when photocell applications are expected; but lead or zinc can be successfully used as activator if only the production of large single crystals is concerned. In the latter case, the semiconductor material can be subsequently be activated by an appropriate substance, e.g. silver, if photoconductive properties are desirable.

The semi-conductor materials which are referred to and used in the inventive process are those electronic conductors which are normally understood by this calling and thus include cadmium sulphide, zinc sulphide, lead sulphide, tellurium, germanium, silicon.

The amount of the activator material used includes any amount in excess of that amount which produces nuclei or crystal formation. As a practical matter, it is sufficient that the concentration of the activating material is in the order of $10^{-3}$ atoms percent, based on the semiconductor material. If the semiconductor is anisotropic, it is possible during the heating step to observe the crystal formation by utilization of polarized light so that it is a simple matter to determine the minimum concentration of the activator material that must be introduced to affect nucleation.

As indicated above, in the production of these single crystals in form of large but thin bodies, the first step is to vacuum deposit upon a substrate a very thin layer of the semiconductor material. As convenient substrate one includes an inert surface such as glass, ceramic material or more generally a vitreous material. The surface of the substrate onto which the semiconducting material is evaporated should preferably be of a finely polished nature. This is especially advisable when one desires that no strains be introduced into the crystal growth during the final heat treatment. An example of this inert surface is highly polished glass. Any conventional technique can be used for the cleaning of the substrate before deposition in order to remove all impurities which can affect the crystal growth. An example of a convenient technique is the ionic cleaning of the substrate surface.

The vacuum deposition of the semiconductor material as a thin layer is conventionally performed at a pressure below $10^{-4}$ mm. of mercury, i.e. $10^{-4}$ Torr. The substrate surface is advantageously heated (to a temperature within the range of 100° C. to 200° C.) prior to deposition of the evaporated layer.

The second material step in the production of the novel crystals is the introduction onto the surface of the evaporated layer of a well distributed small amount of activator material, e.g. $10^{-3}$ atoms percent as indicated above. This is readily accomplished by exposing the evaporated semiconductor material, such as cadmium sulphide for instance, for a fraction of a second to the vapours of the activator, e.g. silver or copper. Alternatively, the activator material might be disposed onto the inert surface prior to vacuum deposition of the semiconductor material or codeposited together with the primary deposit.

The final step in the production of these crystals is the heating step during which the nucleation due to the presence of the activator material occurs, followed by subsequent growth of the crystals under closely held conditions and in an inert atmosphere such as by the use of argon gas.

By closely held conditions, one means conditions where the rate of nucleation compensates the rate at which the crystal front grows. For instance, imposing a rate of nucleation, as expressed by the number of nuclei appearing per second and per square centimeter, equal to hundred times the rate of growth of the crystal front, as expressed in centimeter per second, one gets about 10 crystals per square centimeter. Since the rate of growth is a function of temperature which in turn tends to increase the rate of nucleation, it is apparent for someone skilled in the art that the rate at which the temperature increases must be such as to favor the growing of each appearing nucleus into a large crystal. This is achieved by heating the semiconductor layer in a furnace wherein the heating zone is fairly homogeneous over a large portion of said furnace and by maintaining it until the crystal growth is complete. Both appearance of nuclei and growth of crystals can easily be followed during the heating process, for instance by means of a polariscope.

As a practical matter, the production of the desired large but thin crystals is performed at a temperature whereat a maximum of 10 crystals per square centimeter are produced. Large but thin strain-free crystals are obtained if the rate of growth is less than 0.1 mm. per second.

The present invention will be more easily understood by reference to the drawings and to the following purely illustrative examples.

In FIGURE 1, the crystal producing material 2 is located in a crucible 4, which is heated by means of resistance coils 6. The temperature of the crucible 4 containing the semiconductor material 7 is regulated by observance of the temperature indicated by thermocouple 8. Positioned directly above the crucible 4 is the inert surface 10 of, for example, polished glass, which is pre-heated prior to deposition of the crystal producing material by heater element 12. The temperature of the inert surface 10 is monitored by thermocouple 14. When conditions are proper for the evaporation, plate 16 is removed and evaporation of the semiconductor material onto plate 10 is allowed to take place. After the evaporation of the semiconductor onto plate 10 has been accomplished, the plate 10 is positioned as shown in FIGURE 2. The activator material 18 is placed on a metallic electrode 20 and rapidly heated by means of current flowing from generator 22 through transformer 24 when switch 26 is closed for a brief portion of a second.

After the evaporated layer has received the activator material, it is subjected to heating in an inert atmosphere. According to the temperature-time curve shown in FIGURE 3, the temperature is rapidly raised to point 28 which is the temperature at which nucleation occurs and thereafter closely regulated with a slight increasing temperature to point 30 at which crystal formation is complete.

As an example of this invention, for cadmium sulfide, purse cadmium sulfide is heated in a crucible in a conventional vacuum evaporation apparatus to a temperature of 800° C. The polished glass plate is pre-heated to a temperature of 200° C. in a position 20 cm. removed from the crucible containing the cadmium sulfide. The polished glass plate is exposed to the vapours of the cadmium sulfide for one hour at a pressure lower than $10^{-4}$ mm. After this period, the thickness of the deposit upon the glass plate is 10 microns. The so produced evaporated layer is exposed to silver vapour for 0.1 of a second at a distance of 25 cm. The amount of silver that was deposited produced a concentration of $10^{-3}$ atomic percent of the cadmium sulfide. The activated cadmium sulfide is thereafter heated in argon atmosphere for a period of 4 hours from the temperature of nucleation to that one at which the desired crystals are formed. The temperature of nucleation is 450° C. and the temperature is thereafter raised to 550° C. at a steady rate over the 4-hour period.

The same operations were repeated using copper, lead, zinc, zinc sulfide, aluminum, indium as activator material and they have resulted into large but thin crystals of cadmium sulfide.

Confirmation that large but thin crystals the main diameter of which is larger than 1 mm., the thickness being 10 microns, have been obtained is given by X-rays diffraction and polariscopic investigations.

Single crystals of cadmium sulfide, having 10 microns thickness and 1 square cm. area are produced with electrical characteristics as follows:

| | |
|---|---|
| Dark resistivity | $2.10^6 \Omega$ cm. |
| Resistivity in full sunlight | $2\Omega$ cm. |

With suitable electrodes the resistance of said crystals is:

| | |
|---|---|
| Dark resistance | $1.5.10^7 \Omega$. |
| Resistance in full sunlight | $15\Omega$. |

The same process applies as well to germanium, tellurium, silicon, lead sulfide and zinc sulfide, using the appropriate activator materials.

The semiconducting crystals which have been produced in accordance with this invention are large but thin bodies the dimensions of which were hitherto not realized by a direct process. The semiconductor crystals obtained are characterized by a main diameter which is at least 50 times larger than their thickness. As described above, typical crystals have been produced with a surface of 1 square cm. and a thickness of 10 microns.

The crystals of the invention can be used as such, without cutting operations or further preparative manipulations, in the various applications of semiconductor material, e.g. transistors, rectifiers, modulators, detectors, photocells and the like.

The large but thin crystals produced according to the inventive process are also characterized by photoconductive properties which compare most favorably with those of similar semiconductor crystals prepared or obtained by conventional techniques. For instance, using a photocell of 1 square cm. and a standard 100 lux lighting, one measures a resistivity of $50\Omega$ cm. for cadmium sulfide crystals prepared in accordance with this invention, whereas crystals obtained by standard methods have a resistivity of about 400Ω cm.

The large but thin crystals of semiconductor material obtained are of a strain free character and are thus exceptionally useful in all the applications of semiconductor material wherein this condition is of practical significance.

It is also apparent that the large but thin crystals of semiconductor material can be subsequently activated by appropriate treatment, such as by addition of traces of silver or copper, when particular photoconducting properties are required.

As many apparently widely different embodiments of this invention may be made without departing from the spirit and scope thereof, it is to be understood that the invention is not limited to the specific embodiments therein except as defined in the appended claims.

What is claimed as new and is desired to secure by Letters Patent is:

1. A process for the production of large, thin crystals of semiconductor material consisting essentially of:

(a) vacuum evaporating a layer of said semiconductor material onto a substrate, said layer being less than about 0.1 millimeter thick;

(b) depositing a layer of at least one activating material selected from the group consisting of silver, copper, aluminum, indium, gallium, lead, bismuth, zinc, boron, thallium, phosphorus, arsenic, and antimony onto said layer of semiconductor material by contacting said layer of semiconductor material with the vapors of said activating material; the amount of activating material deposited being at least 0.001 atom percent in the aggregate of the amount of semiconductor material deposited;

(c) increasing the temperature of the resulting layers of semiconductor material and activating material to the temperature at which nucleation occurs while maintaining said layers in a substantially inert atmosphere; and (d) thereafter increasing the temperature of said layers, from said temperature at which nucleation occurs, at a rate sufficient to produce a maximum of 10 crystals per square centimeter and a rate of growth of the crystal front of less than 0.1 millimeter per second until crystal growth in said layer of semiconductor is complete.

2. A process in accordance with claim 1 wherein said substrate is preheated to a tempertaure between about 100° and 200° C. before said vacuum evaporating step.

3. A process in accordance with claim 1 wherein said semiconductor material is at least one material selected from the group consisting of cadmium sulfide, zinc sulfide, lead sulfide, tellurium, germanium and silicon.

4. A process in accordance with claim 1 wherein said semiconductor material is cadmium sulfide, said activating material is silver, and said temperature at which nucleation occurs is 450° C.

5. A process for the production of large, thin crystals of semiconductor materials consisting essentially of:

(a) vacuum evaporating a layer of said semiconductor material onto a substrate, said layer being less than about 0.1 millimeter thick;

(b) vacuum evaporating a layer of at least one activating material selected from the group consisting of silver, copper, aluminum, indium, gallium, lead, bismuth, zinc, boron, thallium, phosphorus, arsenic, and antimony onto said layer of semiconductor material by contacting said layer of semiconductor material with the vapors of said activating material; the amount of activating material deposited being at least 0.001 atom percent in the aggregate of the amount of semiconductor material deposited;

(c) increasing the temperature of the resulting layers of semiconductor material and activating material to the temperature at which nucleation occurs while maintaining said layers in a substantially inert atmosphere; and (d) thereafter increasing the temperature of said layers, from said temperature at which nucleation occurs, at a rate sufficient to produce a maximum of 10 crystals per square centimeter and a rate of growth of the crystal front of less than 0.1 millimeter per second until crystal growth in said layer of semiconductor is complete while maintaining said layers in a substantially inert atmosphere.

References Cited in the file of this patent

UNITED STATES PATENTS

| | | |
|---|---|---|
| 2,600,579 | Rudey et al. | June 17, 1952 |
| 2,651,700 | Gams | Sept. 8, 1953 |
| 2,861,903 | Heimann | Nov. 25, 1958 |
| 2,868,736 | Weinreich | Jan. 13, 1959 |

OTHER REFERENCES

Nature: Sept. 27, 1958, vol. 182, No. 4639, pages 862 and 863.